Patented May 9, 1950

2,506,630

UNITED STATES PATENT OFFICE 2,506,630

METHOD OF PRODUCING STABLE HYPOCHLORITE SOLUTIONS

William Robertson Bruce, London, England

No Drawing. Application October 12, 1944, Serial No. 558,458. In Great Britain March 21, 1944

Section 1, Public Law 690, August 8, 1946
Patent expires March 21, 1964

11 Claims. (Cl. 23—86)

This invention relates to the production of a stable or almost completely stable hypochlorite solution from calcium hypochlorite.

Hypochlorite solutions have an extensive use in commerce and for medical and pharmaceutical purposes, for antiseptic purposes, e. g., in surgery, for wounds and burns, as a mouth wash and cleansing medium for teeth and dentures and as a gargle. For all these and other purposes it is of the utmost importance that the concentration of the available chlorine is kept within rather narrow limits in order to avoid solutions which for the specific purposes required would cause injury to the tissue or instruments coming into contact with the liquor or, on the other hand, be too weak to be effective. In order to meet this requirement it is essential that a stable product is sent out from the chemical works so that directions may be issued for use for different purposes.

As heretofore produced sodium and calcium hypochlorite solutions have been too unstable for many purposes and stable dry salts which can be dissolved for use as required are not altogether satisfactory because the user may not have measuring facilities and, furthermore, such procedure is inconvenient in an emergency even if the dry salt is sufficiently stable.

It will, however, be obvious that from the commercial point of view, if for no other purpose, it would be far more satisfactory to have a stable hypochlorite solution which can be marketed in the form of a liquid which is immediately available for use without the necessity of mixing a dry salt mixture with water or alkali and decanting the solution in the case of making sodium hypochlorite from calcium hypochlorite from the precipitated compounds after they have been formed and settled.

The preparation of sodium hypochlorite by treating calcium hypochlorite with sodium carbonate is well known but such solutions, as hitherto proposed, are not stable.

According to the present invention, however, solutions containing sodium hypochlorite suitable for surgical and pharmaceutical use, and almost completely stable, may be prepared by adding calcium hypochlorite to a hot aqueous solution containing considerable excess alkali carbonate over that required to convert all the calcium to calcium carbonate and separating the latter from the dissolved alkali hypochlorite. The amount of excess carbonate is not very critical but it should be sufficient to leave un-ionised alkali carbonate in the solution.

I have found that contrary to expectation, heating the solution as above described does not cause any appreciable degradation of the hypochlorite and under the conditions set out above an almost completely stable solution of sodium hypochlorite is obtained.

Conveniently the alkali carbonate solution may be at or near boiling point before adding the calcium hypochlorite, preferably at between 180° and 212° F. By this means the calcium carbonate is rapidly formed to completion and an easily filtrable precipitate is obtained.

The presence of an electrolyte further assists the complete removal of the calcium carbonate and as some sodium chloride will be formed and does not interfere with the subsequent use of the hypochlorite liquor, the addition of sodium chloride either simultaneously with or subsequently to the addition of the calcium hypochlorite is advisable.

The employment of the alkali carbonate in the form of bicarbonate will produce an evolution of carbon dioxide which will automatically agitate the liquor during precipitation and ensure that no alkali hydroxide is present.

Other ingredients may be added to the alkali carbonate solution. Thus if borax is required in the final solution it may be added to the alkali carbonate solution and the presence of magnesium carbonate forms a nucleus for the formation of the calcium carbonate.

There will be described hereinafter the method and proportions of ingredients which have so far been found to be the most satisfactory for the production of a stable solution of sodium hypochlorite from calcium hypochlorite, but it will be understood that these are by no means limitative of the present invention.

Experiments which I have so far carried out indicate that the following is the most satisfactory proportion of ingredients to be used in the production of an antiseptic intended mainly for dental purposes:

| | Ounces |
|---|---|
| Water | 100 |
| Sodium bicarbonate | 10 |
| Sodium carbonate | 30 |
| Borax | 2 |
| Magnesium carbonate | 2½ |
| Sodium chloride | 2½ |
| Calcium hypochlorite | 5 |
| Citric acid | 1 |
| Calcium chloride | 2 |
| Calcium phosphate | 4 |

The calcium hypochlorite used with these ingredients is that having 70% available chlorine (for example that sold under the trade-mark "Maxachlor") and since it is the percentage of available chlorine that gives rise to the efficiency of the solution, the proportion of calcium hypochlorite used should be correspondingly increased if the percentage of available chlorine is lower in the actual compound used.

In preparing the solution the ingredients, with the exception of the calcium hypochlorite and the sodium chloride, are taken and are added to the water which is brought to the boil.

Contrary to previous experience which has shown that heat causes degradation of hypochlorite solutions, the calcium hypochlorite is then added and the mixture is allowed to cool whilst being continually stirred and after the solution is cool the sodium chloride is added. This causes the rapid sedimentation of the bye-products present in the solution and thus prevents all chance of the hypochlorite solution being degraded by the physical presence of these bye-products or by a prolonged filtration process.

The clear hypochlorite solution thus produced may be decanted or filtered off and will be found to be stable over a reasonable period of time. It may, therefore, be commercially produced and marketed for any of the purposes for which a hypochlorite solution is known to be useful without fear of the solution becoming useless due to the lapse of time.

Although it has been found that the addition of an electrolyte such as sodium chloride is advantageous, it must be clearly understood that the present invention is not limited to such a step since for certain purposes the rapid sedimentation of the bye-products may not be necessary.

I claim:

1. A process for the preparation of stable solutions containing alkali metal hypochlorite, which process comprises adding calcium hypochlorite to a hot aqueous solution having a temperature of 180° to 212° F. containing excess alkali metal carbonate over that required to convert all the calcium to calcium carbonate and separating the latter from the dissolved alkali metal hypochlorite.

2. A process as claimed in claim 1, in which the calcium hypochlorite is added to said hot aqueous solution containing excess sodium carbonate to prepare a stable solution containing sodium hypochlorite.

3. A process as claimed in claim 1, wherein the calcium hypochlorite is added to the aqueous solution when the latter is substantially at its boiling point.

4. A process as claimed in claim 1, wherein an electrolyte is added simultaneously with the addition of calcium hypochlorite to the solution.

5. A process as claimed in claim 1, wherein an electrolyte is added subsequently to the addition of calcium hypochlorite to the solution.

6. A process as claimed in claim 1, wherein sodium chloride is added simultaneously with the addition of calcium hypochlorite to the solution.

7. A process as claimed in claim 1, wherein sodium chloride is added subsequently to the addition of calcium hypochlorite to the solution.

8. A process as claimed in claim 1, in which the alkali metal carbonate is employed at least partly in the form of a bicarbonate.

9. A process as claimed in claim 1, in which the alkali metal carbonate solution also contains borax.

10. A process as claimed in claim 1, in which the alkali metal carbonate solution also contains magnesium carbonate.

11. A process as claimed in claim 1, in which the alkali metal carbonate solution also contains borax and magnesium carbonate.

WILLIAM ROBERTSON BRUCE.

REFERENCES CITED

The following references are of record in the file of this patent:

UNITED STATES PATENTS

| Number | Name | Date |
|---|---|---|
| 1,481,003 | Gegenheimer | Jan. 15, 1924 |
| 1,545,394 | Cady | July 7, 1925 |
| 1,754,473 | MacMullin et al. | Apr. 15, 1930 |
| 2,046,382 | Hirschkind | July 7, 1936 |
| 2,121,501 | Hershman | June 21, 1938 |
| 2,170,108 | Barton | Aug. 22, 1939 |

FOREIGN PATENTS

| Number | Country | Date |
|---|---|---|
| 25,748 | Great Britain | A. D. 1898 |
| 27,463 | Great Britain | A. D. 1907 |